US006543300B2

(12) United States Patent
Kiviniitty

(10) Patent No.: US 6,543,300 B2
(45) Date of Patent: Apr. 8, 2003

(54) METHOD AND ARRANGEMENT FOR MEASURING LOAD OF HOISTING APPARATUS

(75) Inventor: Ari Kiviniitty, Hämeenlinna (FI)

(73) Assignee: KCI Konecranes International, PLC, Hyvinkaa (FI)

( * ) Notice: Subject to any disclaimer, the term of this patent is extended or adjusted under 35 U.S.C. 154(b) by 0 days.

(21) Appl. No.: 09/940,514

(22) Filed: Aug. 29, 2001

(65) Prior Publication Data

US 2002/0040609 A1 Apr. 11, 2002

(30) Foreign Application Priority Data

Aug. 29, 2000 (FI) ............................................ 20001904

(51) Int. Cl.[7] .............................. G01L 5/04; G01L 5/00

(52) U.S. Cl. ............................ 73/862.393; 73/862.381; 73/862.56

(58) Field of Search ..................... 73/862.381, 862.393, 73/862.56, 862.391, 862.69

(56) References Cited

U.S. PATENT DOCUMENTS 5,859,373 A * 1/1999 Munzebrock et al. .. 73/862.193
6,095,449 A * 8/2000 Gallo et al. ................ 139/452
2002/0040609 A1 * 4/2002 Kiviniitty ............. 73/862.393

FOREIGN PATENT DOCUMENTS

| | | |
|---|---|---|
| DE | 196 17 105 | 10/1997 |
| SE | 454 625 | 5/1988 |

* cited by examiner

*Primary Examiner*—Hezron Williams
*Assistant Examiner*—Lilybett Martir
(74) *Attorney, Agent, or Firm*—Birch, Stewart, Kolasch & Birch, LLP

(57) ABSTRACT

A method and an apparatus for measuring a load of a hoisting apparatus, where electricity is used as the driving force and a squirrel cage motor as the hoisting motor for moving a load attached to a hoisting member of the hoisting apparatus substantially in the vertical direction. The method and arrangement are employed to determine air gap torque of the hoisting motor, which describes the load of the hoisting apparatus, utilizing magnetization flux of the hoisting motor determined on the basis of the current, supply voltage and stator winding resistance of the hoisting motor. The value of the air gap torque is compared with an air gap torque curve determined for the hoisting apparatus at known reference loads to determine the load that corresponds to the air gap torque in question.

19 Claims, 1 Drawing Sheet

METHOD AND ARRANGEMENT FOR MEASURING LOAD OF HOISTING APPARATUS

BACKGROUND OF THE INVENTION

1. Field of the Invention

The invention relates to a method of measuring a load of a hoisting apparatus, where electricity is used as the driving force and a squirrel cage motor as the hoisting motor for moving a load attached to a hoisting member of the hoisting apparatus substantially in the vertical direction, the method comprising measuring the current and supply voltage of the hoisting motor and determining the stator winding resistance of the hoisting motor.

The invention further relates to an apparatus for measuring a load of a hoisting apparatus, where electricity is used as the driving force and a squirrel cage motor as the hoisting motor for moving a load attached to a hoisting member of the hoisting apparatus substantially in the vertical direction, the apparatus comprising means for measuring the current and supply voltage of the hoisting motor and a measuring member for measuring a variable describing the stator winding resistance of the hoisting motor.

2. Description of the Background Art

In hoisting apparatuses which are intended for vertical transfer of load and are typically either fixed or movable along a track by means of a trolley, determination of the load to be hoisted or lowered is very important for safety reasons, particularly for avoiding overloading of the hoisting apparatus. It is also necessary to know the cumulative amount of the load hoisted during the service life of the hoisting apparatus so as to anticipate the need for service of the hoisting apparatus or to determine safe service life. In prior art solutions the load of a hoisting apparatus can be measured either directly or indirectly. The hoisting apparatus load can be determined directly by arranging mechanical sensors, which measure the stretching or tension caused by the load, in the hoisting member of the hoisting apparatus or in another structure which supports the load to be hoisted or lowered. Use of mechanical sensors, however, increases the amount of work and costs both in the manufacture and modernization of the hoisting apparatus. Indirect measurement of the hoisting apparatus load is known from SE 454 625 and DE 19 617 105, where the hoisting apparatus load is determined on the basis of the input power of the hoisting motor. The solutions described in these publications also take the thermal losses generated in stator winding of the hoisting motor into account, i.e. it is either assumed that the losses are constant in the operating range of the hoisting motor or they are determined from the measured current and the stator winding resistance determined on the basis of the stator winding temperature. The stator winding resistance can be determined from the temperature of stator winding according to standard IEC34-1(-94), for example. The problem related to the solutions based on indirect load measurement is, however, that in changing operating conditions typical of hoisting apparatuses the hoisting apparatus load cannot be determined so accurately that reliable overload protection could be implemented for the hoisting apparatus.

SUMMARY OF THE INVENTION

The object of the present invention is to provide a new method and apparatus for determining the load of a hoisting apparatus.

The method of the invention is characterized by determining air gap torque of the hoisting motor, which describes the load of the hoisting apparatus, utilizing magnetization flux of the hoisting motor determined on the basis of the current, supply voltage and stator winding resistance of the hoisting motor and that the air gap torque is compared with an air gap torque curve determined for the hoisting apparatus at known reference loads to determine the load that corresponds to the air gap torque in question.

The apparatus of the invention is characterized in that the apparatus comprises a load measuring device for determining magnetization flux of the hoisting motor on the basis of the current, the supply voltage and a variable describing the stator winding resistance of the hoisting motor and for determining air gap torque of the hoisting motor, which describes the load, on the basis of the magnetization flux and that the load measuring device comprises means for comparing the air gap torque with an air gap torque curve determined for the hoisting apparatus at known reference loads to determine the load that corresponds to the air gap torque in question.

The basic idea of the invention is that in a hoisting apparatus where electricity is used as the driving force and a squirrel cage motor as the hoisting motor for moving a load attached to the hoisting member of the hoisting apparatus substantially in the vertical direction, the load of the hoisting apparatus is determined by first determining magnetization flux by means of the current, the supply voltage and a variable describing the stator winding resistance of the hoisting motor and then, on the basis of the magnetization flux, air gap torque which describes the hoisting apparatus load. After this, the air gap torque is compared with an air gap torque curve of the hoisting apparatus determined at known reference loads to determine the load corresponding to the air gap torque in question.

An advantage of the invention is that by using the magnetization flux of the hoisting motor for determining the air gap torque of the hoisting motor and thus for determining the load of the hoisting apparatus, the hoisting apparatus load can be determined with sufficient accuracy because the effects of varying operating conditions typical of hoisting operation can be clearly seen as changes in the magnetization flux of the hoisting motor. Thus the hoisting apparatus does not need to be provided with separate mechanical sensors to measure the load, and the accuracy of the load measurement result will be better than in prior art solutions employing indirect load measurement, which allows implementation of reliable overload protection for the hoisting apparatus.

BRIEF DESCRIPTION OF THE DRAWINGS

The invention will be described in greater detail in the accompanying drawings, in which.

DETAILED DESCRIPTION OF THE INVENTION

Figure 1:
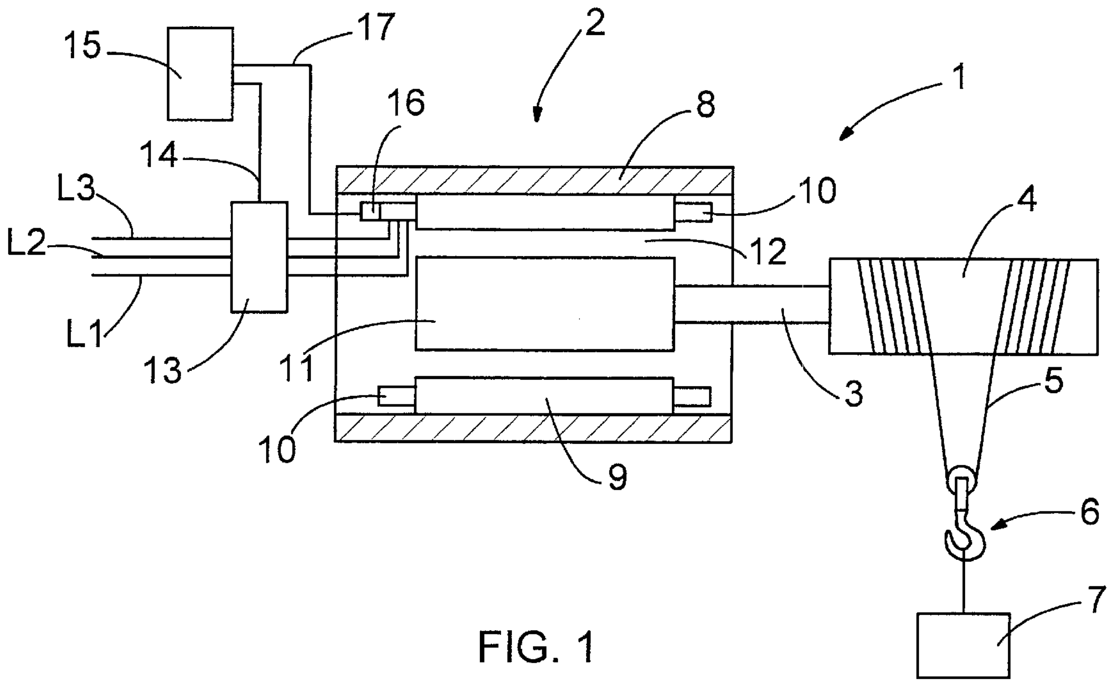
FIG. 1 is a schematic and partly cross-sectional view of a hoisting apparatus in which the method and apparatus of the invention are applied, and FIG. 2 schematically illustrates an air gap torque curve of the hoisting apparatus used in the solution according to the invention.

FIG. 1 is a schematic and partly cross-sectional view of a hoisting apparatus 1 in which the method and apparatus of the invention are applied. The hoisting apparatus 1 shown in FIG. 1 comprises a partly cross-sectional hoisting motor 2, which is arranged to rotate a winding drum 4 through a shaft 3. In FIG. 1 the hoisting motor 2 is arranged to directly rotate the winding drum 4, but the hoisting motor 2 can also be arranged to rotate the winding drum 4 through a gear or gears. Depending on the direction of rotation of the hoisting motor 2 and the winding drum 4, a hoisting member 5 to be stored on the winding drum 4 is either wound on the winding drum 4 or off the winding drum 4, and thus the load 7 hanging from a lifting hook 6 goes up or down. A rope, for example, can be used as the hoisting member 5. The hoisting motor 2 is a three-phase squirrel cage motor in which the hoisting and the lowering speed may be provided with one or more steps, depending on the motor winding. FIG. 1 is a schematic view of the hoisting motor 2, illustrating a frame 8, stator 9, stator winding 10 and rotor 11 of the hoisting motor 11. Between the stator 9 and the rotor 11 there is an air gap 12, the width of which has been clearly exaggerated compared to the rest of the hoisting motor 2. The hoisting motor 2 is connected to a power source, i.e. to the electrical network, via phase conductors L1, L2 and L3. A measuring device 13, which comprises means for measuring the current and supply voltage of the hoisting motor 2 in a manner known per se, is arranged in connection with the phase conductors L1, L2 and L3. The measured current and voltage information can be supplied to a load measuring device 15, which implements the method of the invention, along separate wires, or, like in FIG. 1, along a common cable 14. The load measuring device 15 can also be arranged in connection with the phase conductors L1, L2 and L3, in which case the load measuring device 15 may comprise means for measuring the supply voltage, and thus the measuring device 13 comprises means for measuring the current of the hoisting motor 2. A measuring member 16 is arranged in the stator winding 10 for measuring the stator winding 10 resistance, the value of which is transferred to the load measuring device 15 along a wire 17. Alternatively, the measuring member 16 can measure the temperature of stator winding 10, on the basis of which the stator winding resistance 10 can be determined.

Existing solutions which measure the hoisting apparatus 1 load indirectly by means of the input power of the hoisting motor 2 do not sufficiently take the effect of the magnetization flux change of the hoisting motor 2 on the torque generated by the hoisting motor 2 into account in changing operating conditions typical of hoisting operation. In the solution according to the invention the load of the hoisting apparatus 1 is determined by means of the air gap torque $M_\delta$ of the hoisting motor 2:

$$M_\delta = K_1|\bar{I}\times\overline{\psi}_m| - K_2 f(\psi_m) - K_3\left(\frac{I}{I_n}\right)^2, \tag{1}$$

where $K_1$=a motor-specific constant dependent on the number of the pole pairs, I=hoisting motor current, $\psi_m$=magnetization flux of the hoisting motor, $K_2$=a motor-specific constant dependent on the iron losses and the number of the pole pairs of the hoisting motor, $f(\psi_m)$=motor-specific dependency of the iron losses on the magnetization flux, $K_3$=a motor-specific constant dependent on the additional load losses and the number of the pole pairs of the hoisting motor, and $I_n$=nominal current of the hoisting motor.

In the case of a hoisting motor of less than 4 kW, for example, the values of motor-specific constants $K_1$, $K_2$ and $K_3$ can typically vary in the following ranges: $K_1$=1 to 6, $K_2$=3 to 8 Nm/$V^3$ $s^3$ and $K_3$=0,2 to 0,4 Nm.

At constant speed the air gap torque $M_\delta$ directed to the rotor 11 of the hoisting motor and corresponding to the hoisting apparatus 1 load corresponds to the torque needed to hoist the load 7 when the mechanical friction of the hoisting apparatus 1 is taken into account as will be described below. The air gap torque $M_\delta$ is determined from formula (1) by measuring constantly or at pre-determined intervals the current I, supply voltage U and stator winding 10 resistance R of the hoisting motor 2, which can be used for determining the magnetization voltage of the hoisting motor $U_m$=U−RI. The magnetization voltage $U_m$ generates magnetization flux $\psi_m$ in the hoisting motor 2, which can be determined by integrating the magnetization voltage $U_m$ as a function of time. Use of the magnetization flux $\psi_m$ in the determination of the air gap torque $M_\delta$ is advantageous because the effects of changing operating conditions typical of hoisting operation can be clearly seen as a change in the magnetization flux $\psi_m$ of the hoisting motor 2. Due to asymmetry that may appear in the electricity network, voltages are measured from each of the three phases and currents from at least two phases. The stator winding 10 resistance R can also be determined from formula (2) below according to standard IEC34-1(-94) by measuring the stator winding 10 temperature T during the operation of the hoisting apparatus 1:

$$T+235/T_1+235=R/R_1, \tag{2}$$

where $T_1$=the stator winding temperature (° C.) at the determination moment of the stator winding resistance $R_1$ used as the reference value, T=the stator winding temperature (° C.) at the above-mentioned measurement moment during operation, $R_1$=the stator winding resistance at temperature $T_1$, and R=the stator winding resistance at temperature T.

Figure 2:
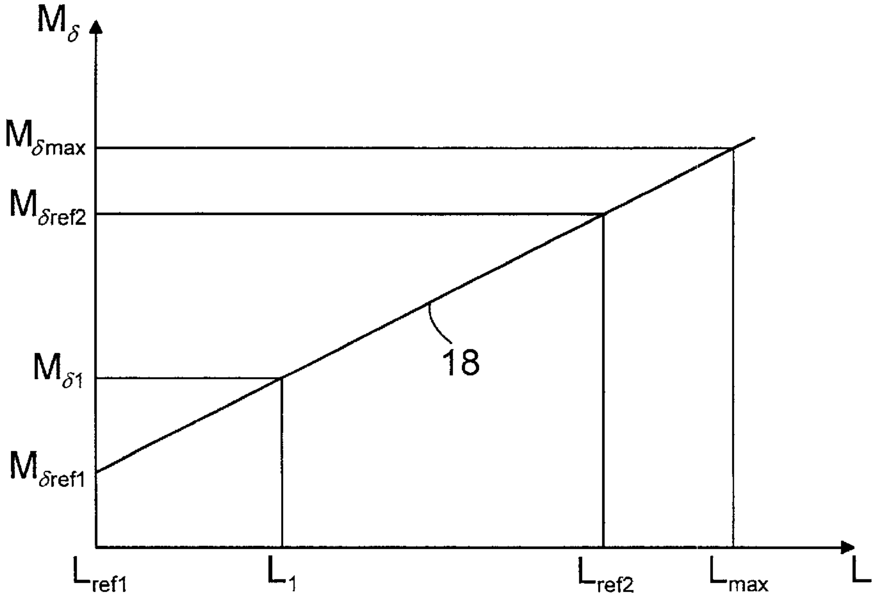

The hoisting apparatus 1 load is determined by means of an air gap torque curve 18, i.e. $M_\delta$ curve 18, of the hoisting apparatus 1 illustrated in FIG. 2, which shows the air gap torque $M_\delta$ determined from formula (1) on the vertical axis and the load L corresponding to it on the horizontal axis. In the solution according to the invention the air gap torque curve 18 is determined by means of test lifts or calibration lifts by hoisting two or more loads 7 of a known weight, which constitute the reference loads ($L_{rf1}$, $L_{ref2}$, . . . ) to be used in the determination of the air gap torque curve 18. By calculating air gap torques ($M_{\delta ref1}$, $M_{\delta ref2}$, . . . ) which correspond to the reference loads ($L_{ref1}$, $L_{ref2}$, . . . ) it is possible to form an air gap torque curve 18 of FIG. 2 which describes the behaviour of the hoisting apparatus 1 as $M_\delta$ and L coordinates. If the value of the air gap torque determined according to formula (1) is $M_{\delta 1}$, the value of the load $L_1$ corresponding to the value of this air gap torque $M_{\delta 1}$ can be determined by means of the air gap torque curve 18 as shown in FIG. 2.

The $M_\delta$ curve 18 of FIG. 2 is hoisting apparatus specific and is determined separately for each speed of the hoisting apparatus both in the direction of the hoisting movement and in the direction of the lowering movement. The zero load of the hoisting apparatus 1 and the nominal load of the hoisting apparatus 1 are typically used as the reference loads ($L_{ref1}$, $L_{ref2}$, . . . ). In FIG. 2, reference load $L_{ref1}$ corresponds to the zero load and reference load $L_{ref2}$ to the nominal load of the hoisting apparatus 1. The air gap torque $M_{\delta ref1}$ caused by the zero load $L_{ref1}$ is not, however, zero because of the mechanical friction of the hoisting apparatus 1. The solution according to the invention also allows detection of overloading of the hoisting apparatus 1 when the maximum load $L_{max}$ allowed is determined and this is used for determining a limit value $M_{\delta max}$ of the air gap torque corresponding to it from the $M_\delta$ curve 18. When the limit value is exceeded, the hoisting movement, i.e. hoisting, and the lowering movement, i.e. lowering, of the load 7 are stopped. The solution also allows collection of long-term loading information on the hoisting apparatus 1 for determining the safe service life of the hoisting apparatus 1.

In the literature the following equation has been proposed for calculating the dependency of the iron losses $K_2 f(\psi_m)$ of the hoisting motor 2 taken into account in formula (1) used for determining the air gap torque $M_\delta$on the magnetization flux $\psi_m$ of the hoisting motor 2

$$K_2 f(\psi_m)=K_2\psi_m^{\ x}, \tag{3}$$

where in the case of standard motors designed for continuous duty the power value x=2 yields a relatively accurate result. However, the hoisting motors used in hoisting apparatuses have normally been optimized for intermittent duty, and thus the density of their magnetization flux $\psi_m$ is higher than that of motors intended for continuous duty. For this reason, the power value x=2 suitable for motors intended for continuous duty is not at all sufficient for motors used in hoisting apparatuses because in hoisting operation even a power value of x=2.5 . . . 3.5 may be needed to describe the change in the iron losses of the hoisting motor 2 as the density of the magnetization flux $\psi_m$ changes. The magnetization flux $\psi_m$ density changes as the motor temperature, the magnitude or direction of the current and the supply voltage vary.

Another essential difference between the standard motors and the hoisting motors is that the hoisting motors usually also have to function as generators during the lowering movement. When the hoisting motor 2 functions as a generator, its magnetization flux $\psi_m$ density is considerably higher than when it functions as a motor, for which reason correct determination of iron losses is essentially important so that the air gap torque $M_\delta$ can be determined accurately during the lowering movement, too. Furthermore, correct determination of iron losses is also important in motors designed to function at relatively high tolerances of supply voltage, e.g. ±10%. In addition, if iron losses have been determined correctly, the hoisting apparatus can be calibrated at the plant even though the voltage level would differ from that of the final application.

Furthermore, the additional load loss term $$K_3\left(\frac{I}{I_n}\right)^2$$

taken into account in formula (1) is essential when the hoisting apparatus load is to be determined with good accuracy, which is required of the overloading protection for the hoisting apparatus, for example.

The method described above is implemented by means of a load measuring device 15 which is arranged in the hoisting apparatus and which can also be provided with overloading protection for the hoisting apparatus. Furthermore, the load measuring device 15 can be provided with a display, to which the load L value determined or another value describing the load or loading is supplied. The load measuring device 15 can be e.g. a device which comprises a microprocessor, in which case implementation of the method according to the invention is simple and economical.

The solution of the invention allows accurate measurement of the hoisting apparatus 1 load without mechanical sensors attached to the hoisting apparatus 1. When the magnetization flux $\psi_m$ of the hoisting motor 2 is used for determining the air gap torque $M_\delta$, the air gap torque $M_\delta$ of the hoisting motor 2 can be determined sufficiently accurately when the operating conditions of the hoisting motor 2, such as the supply voltage, temperature, load, operation as a motor/generator, vary because in the determination of the air gap torque $M_\delta$ according to formula (1) all the terms affecting the torque are taken into account. Since hoisting apparatus 1 specific mechanical effects have also been taken into account in calibration hoisting, the solution of the invention provides reliable overloading protection for a hoisting apparatus or a crane. When lower accuracy is sufficient, iron losses $K_2 f(\psi_m)$ and/or additional load losses $$K_3\left(\frac{I}{I_n}\right)^2$$

can be ignored in formula (1).

It is usually sufficient that the $M_\delta$ curve 18 shown in FIG. 2 includes two reference points and the $M_\delta$ curve 18 is linear between these points. However, the accuracy of load L determination can be improved by selecting several reference points. The reference points can be measured when the apparatus is taken into use and after that regularly at suitable intervals. The more often the reference points are re-measured, the more reliable the load measurement.

The drawings and the related description are only intended to illustrate the inventive concept. The details of the invention may vary within the scope of the claims. Thus the appearance of the hoisting apparatus 1 shown in FIG. 1 can vary in several ways and it can be fixed or movable along a track by means of a trolley. Furthermore, instead of a rope, the hoisting member 5 can be a wire rope, chain, belt or another similar hoisting member. Instead of the winding drum 4, the hoisting member 5 can be stored on a roll, bag, chain bag or the like. The number of phase conductors of the hoisting motor 2 may also vary, depending on the application.

What is claimed is:

1. A method of measuring a load of a hoisting apparatus, where electricity is used as the driving force and a squirrel motor as the hoisting motor for moving a load attached to a hoisting member of the hoisting apparatus substantially in the vertical direction, the method comprising measuring the current and supply voltage of the hoisting motor, determining the stator winding resistance of the hoisting motor, determining air gap torque of the hoisting motor, which describes the load of the hoisting apparatus, utilizing magnetization flux of the hoisting motor determined on the basis of the current, supply voltage and stator winding resistance of the hoisting motor and comparing the air gap torque with an air gap torque curve determined for the hoisting apparatus at known reference loads to determine the load that corresponds to the air gap torque in question.

2. A method according to claim 1, wherein the magnetization flux of the hoisting motor is determined by integrating as a function of time the magnetization voltage of the hoisting motor determined on the basis of the current, supply voltage and stator winding resistance of the hoisting motor.

3. A method according to claim 1, wherein the stator winding resistance is determined by measuring the stator winding resistance during operation.

4. A method according to claim 1, wherein the stator winding resistance is determined on the basis of the temperature measurement of the stator winding during operation.

5. A method according to claim 1, wherein an air gap torque curve of the hoisting apparatus is determined by performing a hoisting test with two known reference loads.

6. A method according to claim 5, wherein the reference loads correspond to the zero load of the hoisting apparatus and the nominal load of the hoisting apparatus.

7. A method according to claim 1, wherein the air gap torque curve of the hoisting apparatus is determined separately for each speed of the hoisting apparatus both in the direction of the hoisting movement and in the direction of the lowering movement.

8. A method according to claim 1, wherein the value of the air gap torque describing the hoisting apparatus load is compared with the maximum value allowed for the air gap torque and when the air gap torque describing the load exceeds the maximum air gap torque allowed, the hoisting movement or the lowering movement of the load is interrupted.

9. A method according to claim 1, wherein the supply voltage of the hoisting motor is measured from all three phases.

10. A method according to claim 1, wherein the current of the hoisting motor is measured from at least two phases.

11. A method according to claim 1, wherein iron losses of the hoisting motor are taken into account in the determination of the air gap torque of the hoisting motor.

12. A method according to claim 1, wherein additional load losses of the hoisting motor are taken into account in the determination of the air gap torque of the hoisting motor.

13. An apparatus for measuring the load of a hoisting apparatus, where electricity is used as the driving force and a squirrel motor as the hoisting motor for moving a load attached to a hoisting member of the hoisting apparatus substantially in the vertical direction, the apparatus comprising means for measuring the current and supply voltage of the hoisting motor, a measuring member for measuring a variable describing the stator winding resistance of the hoisting motor, and a load measuring device for determining magnetization flux of the hoisting motor on the basis of the current, the supply voltage and a variable describing the stator winding resistance of the hoisting motor and for determining air gap torque of the hoisting motor, which describes the load, on the basis of the magnetization flux, the load measuring device comprising means for comparing the air gap torque with an air gap torque curve determined for the hoisting apparatus at known reference loads to determine the load that corresponds to the air gap torque in question.

14. An apparatus according to claim 13, wherein the measuring member is arranged to measure the stator winding resistance.

15. An apparatus according to claim 13, wherein the measuring member is arranged to measure the stator winding temperature.

16. An apparatus according to claim 13, wherein the means for measuring the supply voltage of the hoisting motor are arranged to measure the supply voltage of the hoisting motor from all three phases.

17. An apparatus according to claim 13, wherein the means for measuring the current of the hoisting motor are arranged to measure the current of the hoisting motor from at least two phases.

18. An apparatus according to claim 13, wherein the load measuring device is arranged to collect long-term loading data on the hoisting apparatus.

19. An apparatus according to claim 13, wherein the load measuring device is arranged to be used as overloading protection of the hoisting apparatus.

* * * * *